Dec. 12, 1961   H. KIETZ   3,013,247
TRANSDUCER AND PULSE EXCITATION CIRCUIT
Filed Oct. 7, 1953

INVENTOR

Hans Kietz

United States Patent Office 3,013,247
Patented Dec. 12, 1961

3,013,247
TRANSDUCER AND PULSE EXCITATION CIRCUIT
Hans Kietz, Bremen, Germany, assignor to Atlas-Werke Aktiengesellschaft, Bremen, Germany
Filed Oct. 7, 1953, Ser. No. 384,746
13 Claims. (Cl. 340—5)

This invention relates to an improved arrangement for an iterative and more or less periodic shock excitation of a magnetostrictive transducer by current pulses which originate from sudden variations of the potential of a condenser. Magnetostrictive transducers are used in echo equipment for transmitting short wave trains which after reflection at the bottom of the sea are received as echoes and the time of travel of which is a measure for the depth of the sea.

In the circuit arrangements known hitherto the impact condenser is charged gradually by an electrical source through a resistance and then discharged suddenly through the winding of the transducer by closing a switch. During the gradual charging of the condenser beginning at zero potential just as much energy is lost in the charging resistance as is stored in the condenser and is utilised for exciting the transducer.

An object of my invention is to prevent the loss of energy caused by the gradual charging of the condenser. I have found circuit arrangements provided for exclusively sudden changes of the charge of the condenser causing current pulses to flow through the winding of the transducer. In a preferred embodiment of such a circuit arrangement there is obtained an additional advantage in that it is possible now to reduce the operating voltage to half the value used with customary circuit arrangements without reduction of the intensity of excitation of the transducer.

Another object of the invention is a change-over switch by which alternately one of two electrical sources of different potentials are inserted in the pulse circuit in which another switch is provided to complete the circuit after said change-over switch has been operated.

Another object of my invention in a preferred embodiment is a commutator switch which is adapted to insert the same source of potential in the pulse circuit with alternating polarity.

Another object of my invention is a pulse circuit in which the direction of the pulse current traversing the trigger switch changes at each operation of the switch, thereby greatly diminishing the deterioration of the contacts.

Still another object of my invention is connecting a spark gap in series with the trigger contact. This gap effects an early interruption of the oscillation accompanying the equalization of the potentials on account of which the transducer retains a magnetic polarization enabling it to act as a receiver for returning echo signals immediately after emission of a wave train.

The current pulse originating from the sudden potential variation of the condenser in the pulse circuit is of a partly oscillatory character. For this reason the electrical resonance frequency of the pulse circuit has to be in a definite ratio to the mechanical resonance frequency of the transducer. The oscillatory circuit formed by the condenser and the inductance of the winding of the transducer may be tuned to a frequency between the frequency of the mechanical vibration and half its value. For a distinct type of transducer the winding of which has a fixed number of turns the pulse condenser should have a definite capacity for optimum efficiency which is preferably determined by experiment.

A more comprehensive understanding of this invention is obtained by reference to the accompanying drawing, in which.

Figure 1:
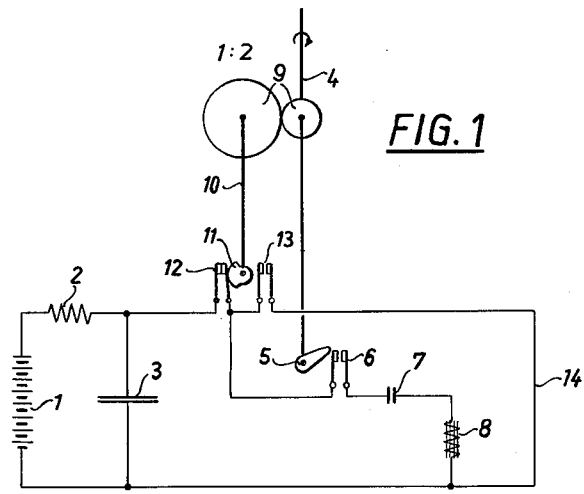
FIG. 1 shows a circuit and switching device for alternately charging and discharging a condenser generating a current pulse at each change according to the invention.

In FIG. 1 a source of current 1 charges a condenser 3 of 20 microfarads to a potential of 1000 volts through a resistance 2 of 1000 ohms. A shaft 4, rotating at a uniform speed, i.e. one revolution per second, may be connected to the gear of an echo sounding apparatus not shown. A cam 5 is fixed to shaft 4 and closes a contact 6 for a short time at each revolution of the shaft. A pulse condenser 7 having a capacity of one microfared and the winding of a magnetostrictive transducer 8 are connected in series with switch 6. A shaft 10 is driven by gear 9 from shaft 4 and rotates at half the speed of shaft 4. A cam 11 is fixed to shaft 10 closing alternately contacts 12, 13 each for a time less than half the period of revolution of shaft 10. Closing contact 12 creates a pulse circuit including condenser 3 as source of potential. On the other hand closing contact 13 creates another pulse circuit through lead 14. It is interesting to note that short circuit may be regarded as source of zero potential.

The arrangement shown operates as follows:
Let condenser 7 be at zero potential initially. With contact 12 closed continued rotation of shaft 4 causes impulse starting contact 6 to close resulting in a pulse current charging condenser 7 to the potential of the storage condenser 3 through the winding of the transducer 8. Contact 6 having opened contact 12 also opens and shortly after the beginning of another revolution of shaft 4 contact 13 closes. The second closing of contact 6 causes condenser 7 to discharge abruptly through lead 14 and the winding of transducer 8.

Charging as well as discharging condenser 7 are discontinuous events. The period of the oscillation accompanying the current pulses is practically the same in both cases as the capacity of condenser is large compared with that of condenser 7.

The potential of the storage condenser 3 diminishes only by a small amount when condenser 7 is charged. The energy loss resulting from the current replenishing the charge of condenser 3 through resistance is small in comparison with the pulse energy exciting the transducer.

Contacts 12 and 13 are operated only with contact 6 opened; there is therefore no deterioration of these contacts by sparking. Sparking is confined to contact 6. However, by the perpetual change of the direction of the pulse current through the contact at each operation of the contact the damage from sparking is substantially smaller than with current flowing always in the same direction.

The pulse being started exclusively by contact 6, it is possible to time the excitation of the transducer 8 accurately in correspondence with the rotation of shaft 4. This is an important condition when using the arrangement as part or in combination with an echo sounding apparatus.

Figure 2:
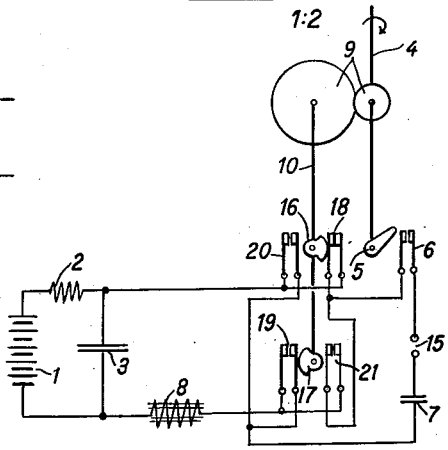
FIG. 2 shows a circuit and switching arrangement, in which a condenser is charged alternately to equal potential of opposite polarity both charges generating current pulses; and, FIG. 3 is a graphical representation of pertinent signal waveforms plotted to a common time scale helpful in understanding the mode of operation of the invention.

FIG. 2 shows a shock exciting device using a source of potential which is inserted in the pulse circuit with alternating polarity.

A source of current 1 charges a storage condenser 3 of a capacity of 20 microfarad through a resistance 2 of 1000 ohms to a potential of 500 volts. A shaft 4 rotating at a uniform speed periodically operates a contact 6 by a cam 5 fixedly attached to the shaft. By a gear 9 shaft 4 drives a shaft 10 at half its own speed of rotation;

cams 16, 17 fixedly attached to shaft 10 operate contact 18, 19 or 20, 21, respectively, closing them alternately for less than one revolution of shaft 4. The magnetostrictive transducer is incorporated in the pulse circuit.

The spark gap 3 and pulse condenser 8 having a capacity of 1 microfarad are connected in series with contacts 6. The distance of the sparking electrodes does not exceed a few tenths of a millimeter allowing the passage of the spark at a potential difference of a few hundred volts.

Storage condenser 3 and transducer 8 on the one hand, and contact 6, gap 15 and condenser 7 on the other hand constitute parts of a pulse circuit which are joint with alternating polarity by the contacts 18, 19 or 20, respectively.

The device operates as follows:

The condenser 7 is supposed to be charged to a potential of minus 500 volts at the beginning of the cycle, the condenser 3 being permanently charged to potential of plus 500 volts. With the contacts 18, 19 closed, closing contact 6 causes a potential difference of 1000 volts to occur at spark gap 15.

The pulse circuit is completed by the jumping over of a spark and condenser 7 changes its potential discontinuously from minus 500 volts to plus 500 volts.

When shaft 4 continuous rotating contacts 20, 21 are closed whilst contacts 18, 19 are open whereby the potential of condenser 3 is passed in an opposite direction to condenser 7. When the contact 6 is now closed the ensuing spark discharge effects a discontinuous change of the potential of condenser 7 from plus 500 to minus 500 volts.

Although the available potential of the current source 1 doesn't exceed 500 volts, the potential of condenser 7 jumps by double the amount, i.e. by 1000 volts. The excitation of the transducer is just as strong as for the device shown in FIG. 1. Hence this embodiment of the invention permits to use a current source of a smaller rating.

Contacts 18, 19 and 20, 21 are closed or opened only with contact 6 opened. There is thus no wear by sparking. On account of the oscillatory character of the pulse current transducer 8 is in general demagnetized with the shock excitation devices hitherto used. Therefore it cannot be used as receiver for signals without additional polarizing devices. By the incorporation of the spark gap 15 in the pulse circuit the oscillatory current is interrupted before the current amplitude has dropped to zero.

The transducer retains a magnetic polarization after the passing of a pulse. This is particularly advantageous when using in an echo sounding equipment the same transducer for emitting sound impulses and for receiving the returning echoes.

Due to the fact that the direction of the current pulses is perpetually changing just as is the case for contact 6 a long life of the electrodes is ensured without that a re-adjustment or a cleaning would be necessary.

By avoiding unnecessary energy losses the shock exciting devices according to the invention puts on the capacity of the current source 1 a smaller demand than that made on the customary devices.

The switch contacts in the pulse circuits in particular the trigger switch 6, can also be operated indirectly by electromagnetic relays.

The device described is equally applicable to shock exciting electromagnetic transducers instead of magnetostrictive transducers.

The sources of potential used in the pulse circuit should have a small internal resistance. Sources of potential suitable to be used for the purpose of the invention may be batteries or large capacity condensers which are charged by a battery or a power unit. The capacity of these storage condensers has to be by 10 to 20 times larger than that of the condenser which discharges rapidly to provide the current pulse so that the percentage potential decrease caused by the current pulses is insignificant.

The term "potential source" as used above may also signify a simple short-circuiting conductor as representing a source of potential zero having very small internal resistance.

Figure 3:
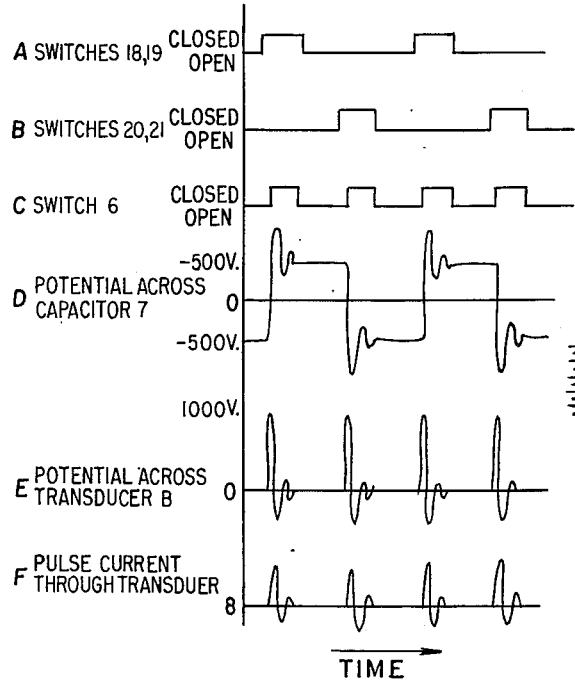

FIGURE 3 illustrates schematically the various voltage and current relationships of the apparatus of FIGURE 2, as a function of time. FIGURES 3a and 3b show the action of commutator switches 18, 19 and 20, 21, respectively, while FIGURE 3c shows the action of trigger switch 6. It will be seen that the latter operates at twice the frequency of either one of the commutator switches. FIGURE 3d illustrates the variation of the potential across condenser 7, the action across gap 15 being fully evident. FIGURE 3e shows the variation of potential across transducer 8, while FIGURE 3f illustrates the current through the transducer winding.

Having thus described the invention it will be apparent that numerous modifications and departures may now be made by those skilled in the art, all of which fall within the scope contemplated by the invention. Consequently, the invention herein disclosed is to be construed as limited only by the spirit and scope of the appended claims.

What I claim is:

1. A transducer circuit for pulse excitation for a transducer comprising a high voltage direct current source, a parallelly connected circuit including a series connection comprising a condenser, a transducer having a current winding and a rapid make and break contact, and two cam switches operative alternatively with one cam switch in series with said series connection and said current source and the other in parallel with said series connection and said current source, means for operating said rapid make and break contact once during each alternative operation of said cam switches in relatively the same position of the cycle of the operation of said cam switches, said cam switches being connected in series with one terminal of the rapid make and break contact, said one cam switch being connected to one side of said direct current source, said other cam switch being connected between the other side of said direct current source and said one terminal.

2. A transducer circuit for pulse excitations of a transducer comprising a high voltage direct current source, a circuit including a rapid make and break contact and a condenser in series, a transducer having a current winding, switching means for impressing upon said current winding the direct current potential in one direction through said series circuit during one closing of said make and break contact and in the other direction through said series circuit during the next closing of said make and break contact.

3. A circuit according to claim 2 including a spark gap in series with said rapid make and break contact and said condenser, said spark gap having an air gap of such a width as to break down under the potential difference appearing across it at each closing of the make and break contact operation.

4. A transducer circuit for pulse excitations of a transducer comprising a high voltage direct current source, a circuit including a rapid make and break contact and a condenser in series, a transducer having a current winding, cam switching means operative over long periods compared to the make and break contact and closed during the operation thereof comprising means for impressing upon said current windings the direct current potential in one direction through said series circuit during one closing of said make and break contact and in the other direction through said series circuit during the next closing of said make and break contact.

5. A transducer pulse excitation circuit comprising a high voltage direct current source, a cam switch connected to one terminal of said source, a transducer having a current winding connected to the other terminal of said source, a condenser and a rapid make and break contact connected intermediate said cam switch and said transducer winding, and means connected between said cam switch and said other source terminal for discharging said condenser after it has been charged.

6. An electrical circuit for delivering pulsed energy to a transducer comprising, said transducer, a high voltage D.-C. source, a series combination including a condenser, a winding on said transducer and a rapid make and break contact, a first switch in series with said high voltage source and said series combination, a second switch in parallel with said series combination, means for closing said first and second switches during first and second alternating mutually exclusive time intervals respectively, and means for operating said rapid make and break contact once during each of said time intervals.

7. An electrical circuit for delivering pulsed energy to a transducer comprising, said tranducer, a high voltage D.-C. source, a series combination including a condenser, a winding on said transducer and a rapid make and break contact, switching means for connecting said series combination to said high voltage source during a first time interval and short circuiting said series combination during a second different time interval, and means including a cam and reduction gears for operating said rapid make and break contact once during each of said time intervals.

8. A pulsing circuit comprising a source of D.C. potential, a transducer connected to said source, first and second commutator switching means respectively connected to said source, trigger switching means connected to said source through one of said commutator switching means, a condenser connected intermediate said trigger switching means and said transducer, means for operating respective switching means in predetermined time relationship to each other, said condenser being charged from said source through said transducer upon the simultaneous closing of said trigger switching means and one of said commutator switching means during first time intervals which alternate with second time intervals and discharging through said trigger switching means, said transducer and the other of said commutating switching means during said second time intervals.

9. In echo sounding equipment including a transducer, a circuit for periodically shock exciting said transducer comprising, a source of D.C. potential connected to said transducer, first and second commutator switching means respectively connected to said source, trigger switching means connected to said source through one of said commutator switching means, a condenser connected intermediate said trigger switching means and said transducer, means for cyclically operating said first and second commutator switching means in alternation at a predetermined frequency, means for cyclically operating said trigger switching means in synchronism with said commutator switching means at twice said predetermined frequency, said condenser being charged from said source through said transducer upon the simultaneous closing of said trigger switching means and one of said commutator switching means during a portion of said cycle.

10. The apparatus of claim 9, wherein said source comprises a D.C. current supply, a resistor connected in series with said supply, a condenser connected across the series combination of said supply and said resistor, said means for operating said switches comprising a first shaft adapted to turn at a predetermined rate, cam means located on said first shaft adapted to close said first and second commutator switching means in alternation once per revolution, a second shaft geared to said first shaft to turn at twice said predetermined rate, and cam means located on said second shaft adapted to operate said trigger switching means such that the latter closes during a portion of each period when first and second switching means are closed.

11. A transducer pulse excitation circuit, comprising a high voltage D.C. source, a series combination connected across said source including said transducer having a current winding connected to one terminal of said source, a condenser, and a rapid make and break contact, a first cam switch connected between said contact and the other terminal of said source, a second cam switch connected in parallel with said series combination, and means for alternately operating said cam switches in synchronism with operation of said rapid make and break contact for charging and discharging during first and second alternate mutually exclusive time intervals respectively said condenser through said transducer.

12. Apparatus for delivering pulsed energy to a transducer comprising, said transducer, a capacitor, a source of a prescribed potential, a winding on said transducer, switching means for reversibly coupling said prescribed potential source to said capacitor, and means for exchanging charge between said capacitor and said source through said winding at least once for each reversal of the coupling of said source to said capacitor.

13. Apparatus for delivering pulsed energy to a transducer comprising, said transducer, a capacitor having a first terminal, a source of a prescribed potential, a winding on said transducer, switching means for selectively coupling said source to said capacitor, means for actuating said switching means, means responsive to the latter actuating means and including said switching means delivering charge from said source to said first terminal through said winding during first time intervals which alternate with second time intervals, and means including said switching means for withdrawing charge from said first terminal through said winding during said second time intervals.

References Cited in the file of this patent

UNITED STATES PATENTS

| | | |
|---|---|---|
| 2,110,015 | Fitzgerald | Mar. 1, 1938 |
| 2,233,992 | Wyckoff | Mar. 4, 1941 |
| 2,561,851 | Fryklund | July 24, 1951 |
| 2,611,352 | Molyneux | Sept. 23, 1952 |

OTHER REFERENCES

Radio Amateur's Handbook, 28th ed., 1951, p. 39.